United States Patent [19]

Hughes

[11] Patent Number: 4,889,377
[45] Date of Patent: Dec. 26, 1989

[54] VEHICLE STORAGE SYSTEM

[76] Inventor: Roger Hughes, 1335 Bennett Dr., Unit #143, Longwood, Fla. 32750

[21] Appl. No.: 85,138

[22] Filed: Aug. 14, 1987

[51] Int. Cl.$^4$ .............................................. B60R 11/06
[52] U.S. Cl. ...................................... 296/3; 296/24.1; 296/37.6; 211/162; 211/88; 224/42.44; 224/281; 16/102; 414/522
[58] Field of Search ............ 296/37.6, 24 R, 26, 296/3, 7, 18, 21; 224/281, 42.43, 42.44, 310; 414/522; 211/162, 88; 16/89, 90, 102, 103, 106

[56] References Cited

U.S. PATENT DOCUMENTS

| | | | |
|---|---|---|---|
| 637,361 | 11/1899 | Suters | 296/24 R |
| 654,660 | 7/1900 | Markline | 296/24 R |
| 679,962 | 8/1901 | Handschumaher | 16/102 |
| 1,361,845 | 12/1920 | Frantz | 16/103 |
| 1,720,260 | 7/1929 | Bowen, Jr. et al. | 296/21 |
| 3,757,967 | 9/1973 | Colbridge | 211/162 X |
| 3,883,004 | 5/1975 | Slaga | 211/162 |
| 4,008,807 | 2/1977 | Phillips | 211/162 X |
| 4,030,609 | 6/1977 | Liebetrau | 211/162 |
| 4,131,203 | 12/1978 | Bridges | 211/88 |
| 4,705,315 | 11/1987 | Cherry | 296/37.6 X |

FOREIGN PATENT DOCUMENTS

| | | | |
|---|---|---|---|
| 2819396 | 11/1979 | Fed. Rep. of Germany | 16/102 |
| 8500733 | 2/1985 | PCT Int'l Appl. | 296/37.6 |
| 2164610 | 3/1986 | United Kingdom | 296/37.1 |

OTHER PUBLICATIONS

American Van Equipment, Inc., catalog 23, Fall 1984, pp. 6, 7 and 12.

*Primary Examiner*—Dennis H. Pedder

[57] ABSTRACT

A vehicle storage system apparatus is attached to a vehicle and adapted to slide out on a suspension frame to make storage bins and the like more accessible from the vehicle. A vehicle body, such as a panel truck or van, has a vertically suspended framework attached to the vehicle body. The frame has at least two horizontal channels supported thereon and a sliding carriage which is slidably mounted in the channels and supported by the channels and which can be slid from a first position in the vehicle to a second position extending from the vehicle. The sliding carriage has a panel attached thereto with a plurality of storage members attachable to the panel. The panel has attaching openings therein for attaching storage bins. The locking conventional allows the sliding storage carriage to be locked in place in the vehicle and to be released from outside the vehicle for sliding the carriage to a position extending from the vehicle.

10 Claims, 2 Drawing Sheets

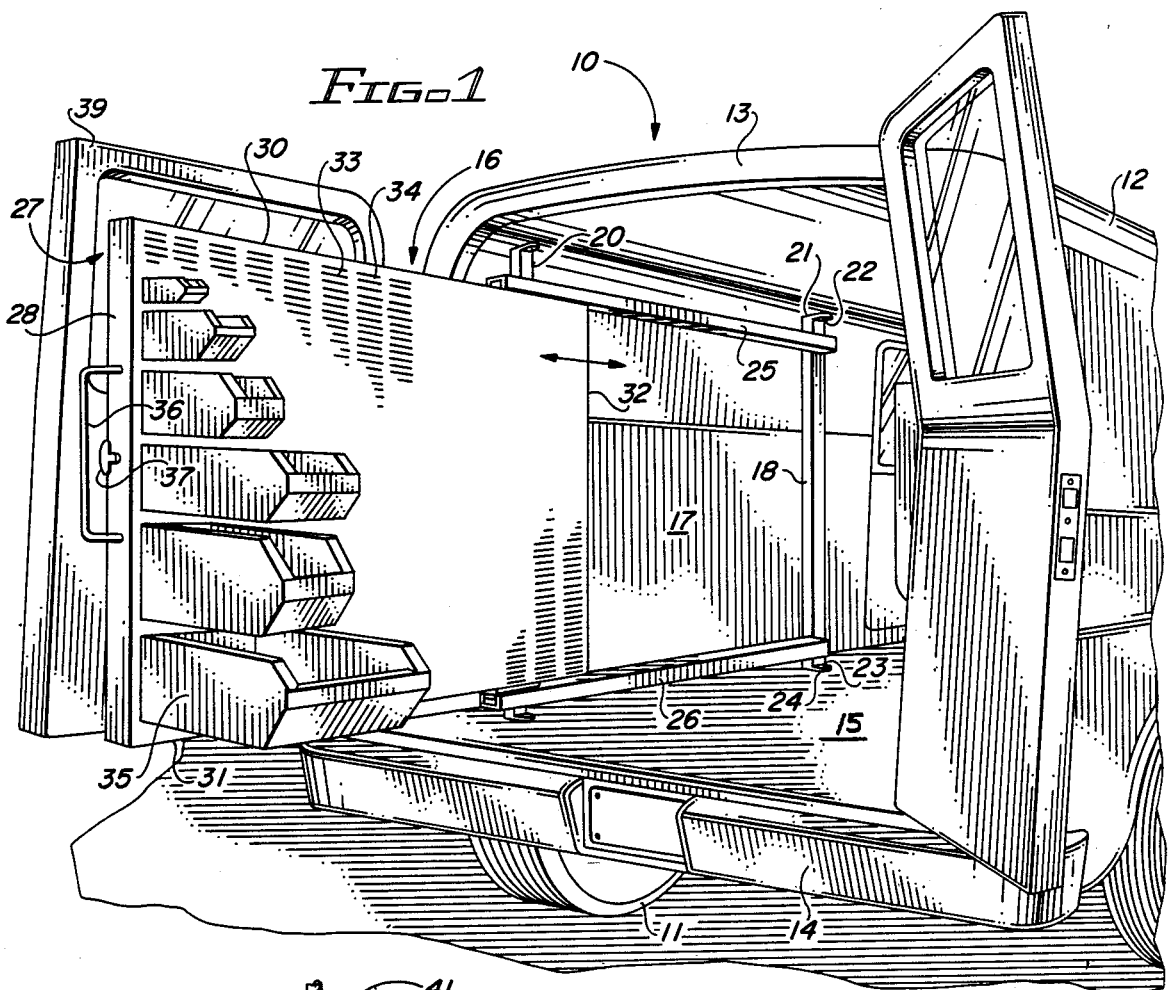
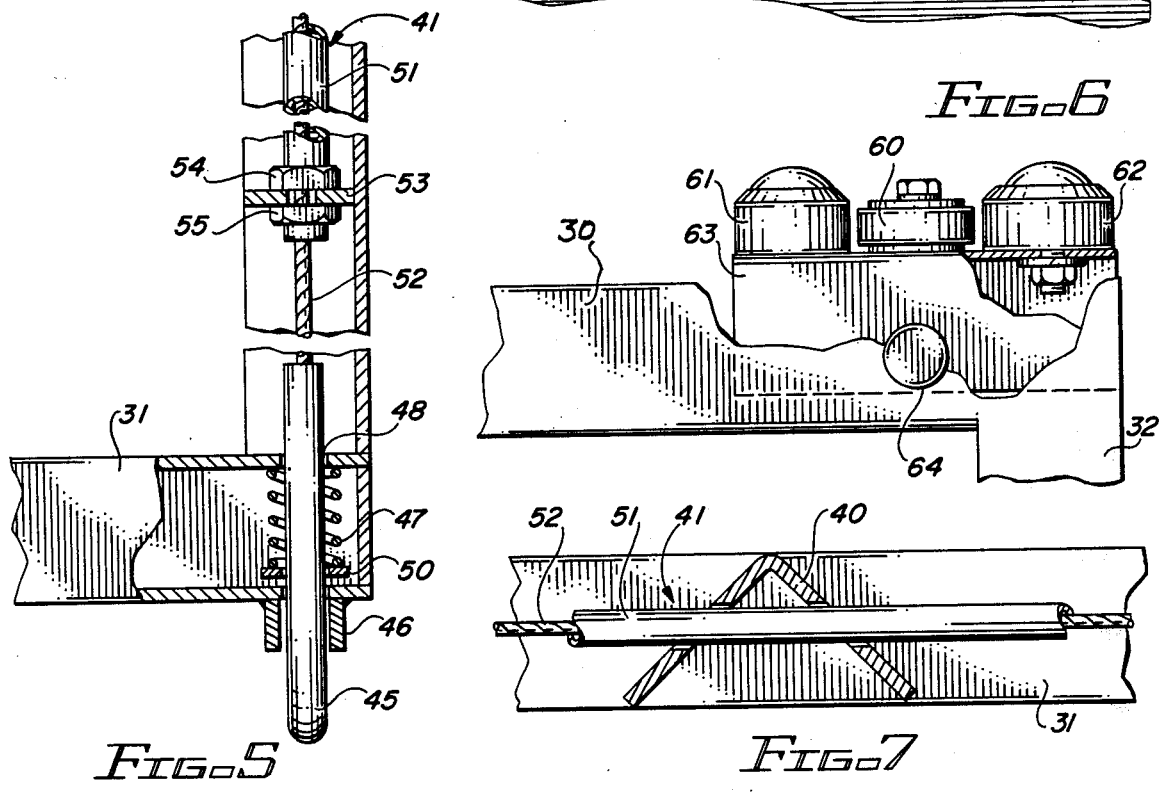

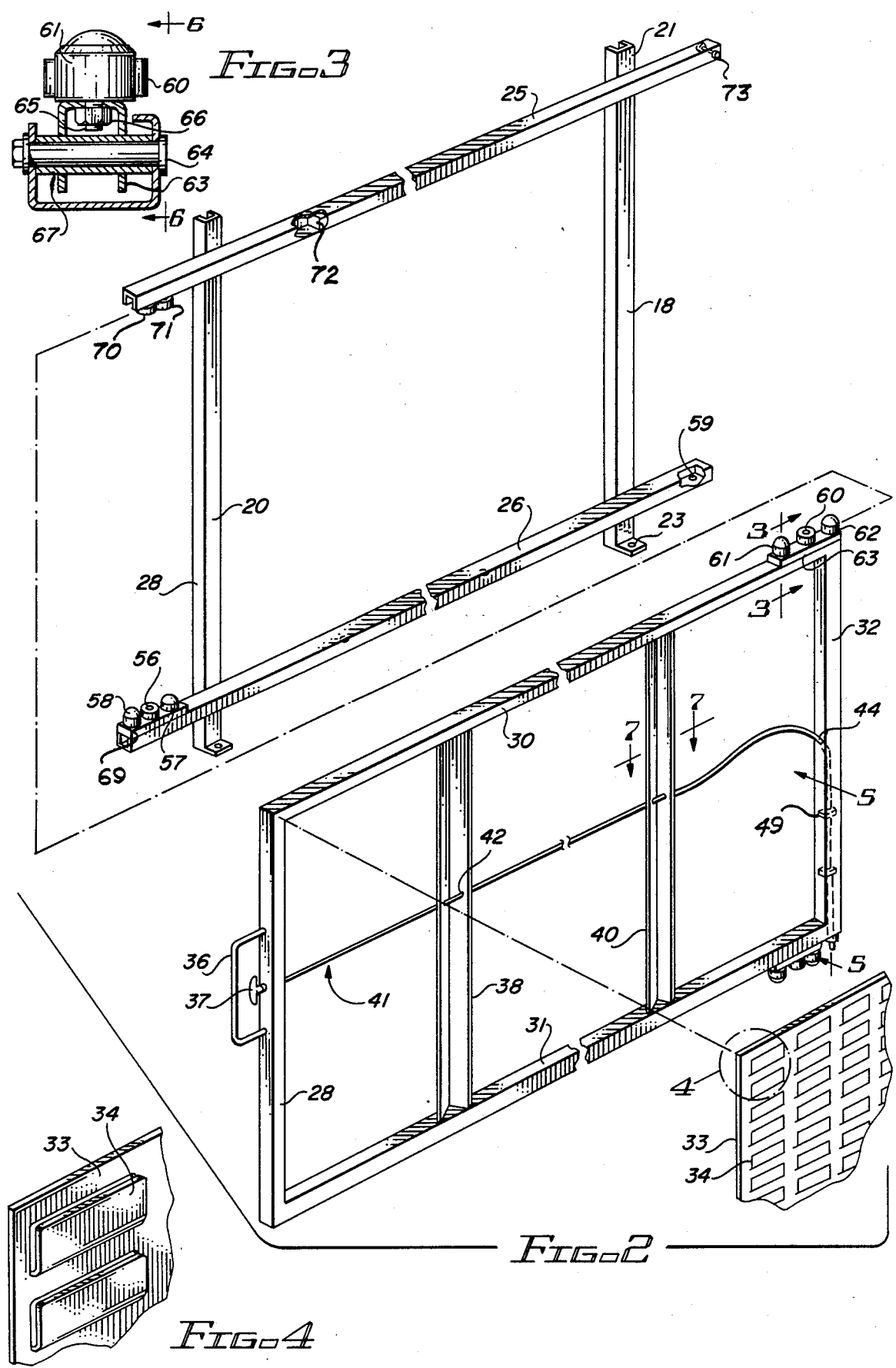

VEHICLE STORAGE SYSTEM

BACKGROUND OF THE INVENTION

The present invention relates to a vehicle storage system and especially a carriage which can be mounted in a vehicle for sliding to a position extending from the vehicle for holding storage bins and the like.

In the past it has been common for service oriented industry, such as plumbing, electrical, air-conditioning, and heating repair services to provide on-the-spot service from trucks or vans. Typically, vans and trucks are utilized which have been modified to attach various types of storage bins and facilities inside the vehicle for keeping repair parts and tools in an orderly fashion. A standard van will have various shelving, storage bins, and boxes mounted thereinside. This becomes unwieldly because one has to enter the van, which is not well lighted, to search for repair parts or the correct tools for a particular job and which is invariably full of other necessary unwieldly equipment used by the tradesman, such as pipes, ladders, hoses, and the like to be used or installed by the tradesman. To overcome this problem the present invention is directed towards a van or paneled truck which has a modular sliding carriage storage system which attaches to the vehicle body or frame and maintains storage bins or displays units on peg board or slotted panels. The panel is anchored to a sliding frame, sliding in a fixed suspension fixedly attached to the inside of the vehicle, so that the panels and storage bins can be slid in suspension out the back or side door of a van. The sliding carriage needs to be locked in place when in transit and to be able to be quickly unlocked for sliding the carriages out so access can be gained to the storage bins from outside of the vehicle thereby offering considerable time savings to the operator.

Typical prior U.S. patents having sliding racks, panels or tables may be seen in U.S. Pat. No. 3,826,529 to Wood, for a truck body with suspension rack in which the side of a pickup truck has a rack for tools mounted thereon and which is slid backwards for better access to a tool chest. In U.S. Pat. No. 1,720,260, to Bowen, Jr., et al, a vending and self service storage unit is provided with a series of sliding panels. In U.S. Pat. No. 2,784,027 to Temp, a drawer unit for pick-up trucks allows the bottom of the pick-up truck to be slid outwards from the pick-up truck. In U.S. Pat. No. 3,640,423, to Parker, et al., a tool box for pick-up trucks has a hinged cover. In U.S. Pat. No. 4,305,695, to Zachrick, a rollout tray for a panel truck bed is provided for extending from the back of a truck on casters and has a drop down support for the horizontally positioned trays. In the Truelove, Sr., U.S. Pat. No. 3,534,892, a utility rack for station wagons is provided, while in the Zelin patent, U.S. Pat. No. 3,726,422, a similar sliding luggage rack for a wagon is provided with legs. In the Tuohy, III, U.S. Pat. No. 4,522,326, a rolling tool box is provided on the back of a pick-up truck while in the Weber patent, U.S. Pat. No. 3,698,565, a display panel for merchandise allows display panels to get attached along a wall. In contrast to these prior patent the present invention provides a modular unit which has the entire unit bolted into a vehicle, such as a van or panel truck, and provided a suspension vertically extending carriage which locks in the van and locks in an extended position extending from the van for easy access to storage bins or the like.

SUMMARY OF THE INVENTION

The present invention relates to a vehicle storage system mounted in a vehicle, such as a paneled truck, van or the like, and includes a vehicle body having a vertically suspended framework attached to the vehicle body. Two channels are horizontally supported on the framework and support a sliding carriage slidably mounted in the channel and supported thereby for sliding in the channels from a first position in the vehicle to a second position extending from the vehicle. A sliding carriage has a panel attached thereto having attaching means such as slots or openings for attaching a plurality of storage bins or other storage members thereto for sliding therewith. Rollers are mounted to the channels and to the sliding carriage for allowing the carriage to slide in and out and a locking cable allows a locking pin to be actuated from outside the vehicle to lock the carriage in the channels in the vehicle and to be unlocked for allowing the carriages to slide on the channels to extend from the vehicle and then to lock the sliding carriage in its extended position. Stops are also provided in the channels and in the sliding carriage to prevent the carriage from extending pass the end of the supporting channels.

BRIEF DESCRIPTION OF THE DRAWINGS

Other objects features and advantages of the present invention will be apparent from the written description and the drawings in which;

FIG. 1 is a perspective view of a vehicle having a storage panel attached thereto in accordance with the present invention;

FIG. 2 is a exploded view of the modular sliding storage system for attaching to a vehicle;

FIG. 3 is a sectional view taken on the line 3—3 of FIG. 2;

FIG. 4 is a partial perspective of the panel taken on the circle 4 of FIG. 2;

FIG. 5 is a sectional view taken on the line 5—5 of FIG. 2;

FIG. 6 is a partial elevation taken on the line 6—6 of FIG. 3; and

FIG. 7 is a sectional view taken on the line 7—7 of FIG. 2.

DESCRIPTION OF THE PREFERRED EMBODIMENT

Referring to the drawings, FIGS. 1 through 7, a vehicle or service van 10 is shown in FIG. 1 having wheels 11, sides 12, a top body portion 13, a rear bumper 14 and floor 15. A modular vehicle interior storage panel system 16 is mounted on one side of the inside 17 and includes a pair of vertically suspended frame members 18 and 20 having top brackets 21 and being attached with bolts 22 or other fastening members as desired. The bottom of frame members 18 and 20 have feet 23 and attach with bolts or other fasteners 24. A pair of horizontal channels 25 and 26 are mounted top and bottom respectively to the frame members 18 and 20 at predetermined parallel spaced positions and have a sliding carriage 27 slidable therein. The slidable carriage 27 has a front vertical frame member 28, top horizontal frame member 30, a bottom horizontal frame member 31 and a rear vertical member 32 and includes a panel 33 mounted to the frame and having a plurality of flat hooks 34 for attaching a plurality of storage bins 35, or the like, thereto. It should be clear that the panel 33 can have peg board or other attaching means in lieu of hooks 34 for attaching storage bins 35, as well as display cases and any other removably attachable units. The sliding carriage 27 has a handle 36 attached to the frame member 28 and a release handle 37 adjacent to handle 36 and connected through the frame member 28.

In FIG. 1 a modular vehicle storage system 16 is shown mounted to a vehicle 10 and has been slid out on its suspension system through a door 39 opened to an open position. It should of course be clear that a similar storage system can be mounted on the other wall 12 of the van, as well as behind the front seat of the van 10 for sliding out a side door. A sliding carriage 27 can be slid back into the van on the channels members 25 and 26 by pushing on the handle 36 until it is fully retracted in the van at which time it is spring latched to the frame member 26 as hereinafter described. The door 39 can then be closed with the secured storage panel positioned in the van and the van driven to the next work site.

As more clearly seen in FIG. 2, the carriage framework 27 has two intermediate vertical frame supports 38 and 40 connected between the slidable carriage bottom frame member 31 and the slidable carriage top frame member 30 for additional support of the carriage. The handle 37 is connected through a sliding cable 41 passing through an oopening 42 in member 3B and through an opening 43 in the frame member 40 and into frame member 32 and through a clamp 49. The cable 41 then extends down the frame member 32 and is connected to a locking pin 45. As seen in FIG. 5, the locking pin 45 slides in a sleeve 46 and is spring loaded with a spring 47. Locking pin 45 slides through an aperture 48 while the spring 47 is compressed between the inside of frame member 31 and a washer 50 attached to the locking pin 45. The cable 41 has an outer sleeve 51 and an inner sliding cable 52 and has the outer sleeve portion 51 bolted to a bracket 53 with a pair of nuts 54 and 55. The locking pin 45 extends into aligned openings 59 in the bottom channel 26 which has an opening in each end portion thereof for locking the suspension sliding carriage 27 in either a position inside the van or an extended position extending from the van as shown in FIG. 1. The bottom channel 26 has a suspension frame 69 mounted on one end thereof with a pair of ball rollers 57 and 58 and a guide 56. The guide 56 guides against the sides of the bottom channel 31 while the ball rollers 57 and 58 allow the channel 31 to roll thereon. The top channel 25 has horizontal roller thrust bearing 70 and a guide 71 mounted to one end thereof.

The sliding carriage 27 top frame member 30 and bottom frame member 31 have pivoted members 63 at the opposite end from the rollers mounted on channel 26 and includes ball rollers 61 and 62 and guides 60 as shown in FIG. 3 and in FIG. 6. The ball rollers 61 and 62 and the guides 60 are mounted to support members 63 which are pivotably mounted to channels 30 and 31 with a pivot bolt 64. The ball rollers 61 and 62 may have a bolt 65 extending from the bottom thereof for attachment with a nut 66 to the pivoted member 63. The pivoted member 63 can be attached to frame members 30 and 31 with bolt 64 supporting a pivoting sleeve 67 enabling it to pivot while carriage 27 is moving in and out of vehicle 10.

The sliding carriage 27 has a latch releasing handle 37 pulled to release the locking pin 45. The carriage can be slid in the channels 25 and 26 with the guides 56, 60 and 71 guiding the carriage 27 in the channels until the support member 63 on channel 30 bumps against the stop 72 which prevents further extension of the carriage 27. The carriage 27 is also suspended on the ball rollers 57, 58, 61 and 62. When fully extended the locking pin 45 locks in an aperture in the channel 26 to hold the carriage in place in an extended position. To return the carriage 27, handle 36 can be grasped and the handle 37 pulled to release the pin 45 from the aperture in the channel 26 to slide the carriage 27 on the channels 25 and 26 back into the van until the pivoted member 63 on channel 30 bumps against bolt 73 on the channel 25 thereby limiting the movement of carriage 27. Removing a bolt 73 allows the carriage 27 to be slid out of the frame members 25 and 26 and removed or reinserted as desired. The locking pin 45 can then slide in on aperture 59 in the channel 26 to lock the sliding carriage 27 in place.

Advantageously, the sliding storage carriage 27 can have different size bins 35 or display units quickly attached and removed to the peg board or other panel 33 for keeping spare parts, tools, or other items, sorted as desired for quick access from outside the van while working on a project. The present invention, however, should not be considered limited to the forms shown which are to be considered illustrative rather than restrictive.

I claim:

1. A storage system comprising in combination:
   a vehicle body;
   a vertical extending framework attached to said vehicle body and including a plurality of vertical frame members;
   at least two channels horizontally supported on said framework, said horizontally supported channels including an upper channel and a lower channel and said upper channel having a guide member on one end portion thereof;
   a sliding carriage slidably mounted to said channels and supported thereby and adapted to slide therein from a first position in said vehicle to a second position extending from said vehicle, said sliding carriage having a panel attached thereto and said sliding carriage having an upper frame member, a lower frame member and a plurality of vertical frame members, said sliding carriage further including:
   (a) a guide member and two roller bearing members mounted adjacent the guide member on one end portion of the upper frame member;
   (b) a guide member and two roller bearing members adjacent the guide member on one end portion of the lower frame member; and
   (c) means for pivotably supporting the guide members and roller bearing members at the respective end portions of the upper and lower frame members;
   a plurality of removable storage members for attaching to said sliding carriage panel; and
   attaching means formed on said sliding carriage panel for removably attaching said plurality of storage members to said panel.

2. A storage system in accordance with claim 1 in which said horizontally supported channels' upper channel has a roller bearing mounted there adjacent said guide member 3. A storage system in accordance with claim 2 in which said horizontally supported channels' lower channel has a guide member mounted on one end portion thereof.

4. A storage system in accordance with claim 3 in which said horizontally supported channels' lower channel has a pair of roller bearings mounted on one end portion thereof adjacent said guide member.

5. A storage system in accordance with claim 1 in which said horizontally supported channel' upper channel has a first and a second carriage stop thereon for stopping the sliding of said sliding carriage.

6. A storage system in accordance with claim 5 in which said horizontally supported channels' upper channel second stop is a removable bolt which can be removed to allow the removal of said sliding carriage.

7. A storage system in accordance with claim 1 in which said sliding carriage panel attaching means are flat hooks.

8. A storage system in accordance with claim 7 in which said sliding carriage includes latching means for latching said sliding carriage in a retracted position.

9. A storage system in accordance with claim 8 in which said sliding carriage latching means includes a spring biased pin positioned to slide in openings into said lower channel.

10. A storage system in accordance with claim 9 in which said sliding carriage latching means includes a sliding cable connected to said sliding pin for remotely withdrawing aid sliding pin from said lower channel opening whereby said sliding carriage can be slid from one position to a second position and latched in place.

* * * * *